United States Patent
Shen et al.

(10) Patent No.: US 11,255,973 B2
(45) Date of Patent: Feb. 22, 2022

(54) METHOD AND APPARATUS FOR EXTRACTING LANE LINE AND COMPUTER READABLE STORAGE MEDIUM

(71) Applicant: BAIDU ONLINE NETWORK TECHNOLOGY (BEIJING) CO., LTD., Beijing (CN)

(72) Inventors: Lixia Shen, Beijing (CN); Ruijie Hou, Beijing (CN); Shiyu Song, Beijing (CN); Fangfang Dong, Beijing (CN)

(73) Assignee: Apollo Intelligent Driving Technology (Beijing) Co., Ltd., Beijing (CN)

( * ) Notice: Subject to any disclaimer, the term of this patent is extended or adjusted under 35 U.S.C. 154(b) by 203 days.

(21) Appl. No.: 16/354,071

(22) Filed: Mar. 14, 2019

(65) Prior Publication Data
US 2019/0370565 A1 Dec. 5, 2019

(30) Foreign Application Priority Data
Jun. 1, 2018 (CN) .......................... 201810559318.1

(51) Int. Cl.
| | |
|---|---|
| G01S 17/89 | (2020.01) |
| G06K 9/00 | (2006.01) |
| G06K 9/62 | (2006.01) |
| G01S 17/86 | (2020.01) |
| G01S 17/931 | (2020.01) |

(52) U.S. Cl.
CPC .............. *G01S 17/89* (2013.01); *G01S 17/86* (2020.01); *G01S 17/931* (2020.01); *G06K 9/00798* (2013.01); *G06K 9/6201* (2013.01); *G06K 9/6289* (2013.01)

(58) Field of Classification Search
None
See application file for complete search history.

(56) References Cited

U.S. PATENT DOCUMENTS

| | | | |
|---|---|---|---|
| 9,383,753 B1* | 7/2016 | Templeton | ............. G01S 17/10 |
| 2010/0086174 A1 | 4/2010 | Kmiecik et al. | |
| 2016/0012298 A1* | 1/2016 | Maeda | ...................... G06T 7/60 |
| | | | 382/104 |

(Continued)

FOREIGN PATENT DOCUMENTS

| | | | |
|---|---|---|---|
| CN | 104766058 A | | 7/2015 |
| CN | 105701449 A | * | 6/2016 |

(Continued)

OTHER PUBLICATIONS

Yang, Bisheng, et al. "Automated extraction of road markings from mobile LiDAR point clouds." Photogrammetric Engineering & Remote Sensing 78.4 (2012): 331-338. (Year: 2012).*

(Continued)

*Primary Examiner* — Samah A Beg
(74) *Attorney, Agent, or Firm* — Lathrop GPM LLP

(57) ABSTRACT

A method and an apparatus for extracting a lane line, a device, a computer readable-storage medium and a collection entity are provided. The method includes: obtaining a first group of lane lines of a road based on a first image generated from a point cloud collected by a laser radar; obtaining a second group of lane lines of the road based on a second image collected by a camera; and determining a lane line set of the road based on the first group of lane lines and the second group of lane lines.

11 Claims, 4 Drawing Sheets

(56) References Cited

U.S. PATENT DOCUMENTS

| | | | | |
|---|---|---|---|---|
| 2017/0039436 | A1* | 2/2017 | Chen | G06K 9/4628 |
| 2018/0061226 | A1* | 3/2018 | Thelen | G08G 1/0141 |
| 2018/0181817 | A1* | 6/2018 | Yan | G06K 9/6273 |
| 2018/0188027 | A1* | 7/2018 | Zhang | G06T 7/68 |
| 2018/0188038 | A1* | 7/2018 | Yang | B60W 40/06 |
| 2018/0316873 | A1* | 11/2018 | Wei | G05D 1/0236 |
| 2019/0147255 | A1* | 5/2019 | Homayounfar | G06N 3/0454 |
| | | | | 701/23 |
| 2019/0163989 | A1* | 5/2019 | Guo | G08G 1/167 |
| 2019/0176841 | A1* | 6/2019 | Englard | G01S 13/865 |
| 2020/0104607 | A1* | 4/2020 | Kim | G06T 7/13 |
| 2020/0182631 | A1* | 6/2020 | Yang | G01C 21/3492 |
| 2020/0285869 | A1* | 9/2020 | Mansour | G06N 3/08 |
| 2021/0209941 | A1* | 7/2021 | Maheshwari | G06T 7/11 |

FOREIGN PATENT DOCUMENTS

| | | |
|---|---|---|
| CN | 107610084 A | 1/2018 |
| CN | 107798010 A | 3/2018 |

OTHER PUBLICATIONS

Yang, Bisheng, Lina Fang, and Jonathan Li. "Semi-automated extraction and delineation of 3D roads of street scene from mobile laser scanning point clouds." ISPRS Journal of Photogrammetry and Remote Sensing 79 (2013): 80-93. (Year: 2013).*

Chinese Patent Application No. 201810559318.1, First Office Action dated Feb. 21, 2020, 7 pages.

Chinese Patent Application No. 201810559318.1, English translation of First Office Action dated Feb. 21, 2020, 10 pages.

* cited by examiner

METHOD AND APPARATUS FOR EXTRACTING LANE LINE AND COMPUTER READABLE STORAGE MEDIUM

CROSS-REFERENCE TO RELATED APPLICATION

The present application is based upon and claims priority to Chinese Patent Application No. 201810559318.1, filed on Jun. 1, 2018, the entirety contents of which are incorporated herein by reference.

FIELD

The present disclosure generally relates to the field of computer technologies, and more particularly to a method and an apparatus for extracting a lane line and a computer-readable storage medium.

BACKGROUND

A lane line is a solid line or a dashed line on a road for dividing different lanes. Methods for creating the lane line may include a hot melt scribing method, a cold paint scribing method, a hot melt oscillating scribing method, etc. Automatic driving requires the use a high accuracy map. Extracting a high accuracy lane line is an important part in the process of generating the high accuracy map. Extracting a high accuracy lane line is also a necessary procedure in automatic driving. In other words, the production of the high accuracy lane line is a premise for a commercial application of the automatic driving technology.

Computer vision is used for enabling a computer to sense the outside world, which uses a camera or a video camera and a computer instead of using human's eyes to perform recognition, tracking, measuring and the like on a target, and performs also processing on a collected image. For example, the image of the road may be collected by using the camera, and a two-dimensional lane line is extracted from the collected image, and then the generated two-dimensional lane line is transformed to a three-dimensional lane line through a matrix transformation. The three-dimensional lane line may be used in a scene such as automatic driving and an auxiliary driving.

SUMMARY

According to exemplary embodiments of the present disclosure, a method and an apparatus for extracting a lane line and a computer-readable storage medium are provided.

Embodiments of the present disclosure provide a method for extracting a lane line. The method includes: obtaining a first group of lane lines of a road based on a first image generated from a point cloud collected by a laser radar; obtaining a second group of lane lines of the road based on a second image collected by a camera; and determining a lane line set of the road based on the first group of lane lines and the second group of lane lines.

Embodiments of the present disclosure provide an apparatus for extracting a lane line. The apparatus includes: one or more processors; and a memory, configured to store one or more computer programs; in which when the one or more computer programs are executed, the one or more processors are caused to: obtain a first group of lane lines of a road based on a first image generated from a point cloud collected by a laser radar; obtain a second group of lane lines of the road based on a second image collected by a camera; and determine a lane line set of the road based on the first group of lane lines and the second group of lane lines.

Embodiments of the present disclosure provide a computer-readable storage medium. A computer program is stored on the computer-readable storage medium. When the computer program is executed, methods or procedures according to embodiments of the present disclosure are implemented.

It should be understood that, descriptions in Summary of the present disclosure does not aim to limit a key or important feature in embodiments of the present disclosure, and does not used to limit the scope of the present disclosure. Other features of the present disclosure will be easily understood by following descriptions.

BRIEF DESCRIPTION OF THE DRAWINGS

The above and other features, advantages and aspects of respective embodiments of the present disclosure will become more apparent with reference to accompanying drawings and following detailed illustrations. In the accompanying drawings, the same or similar numeral references represent the same or similar elements, in which.

DETAILED DESCRIPTION

Figure 1:
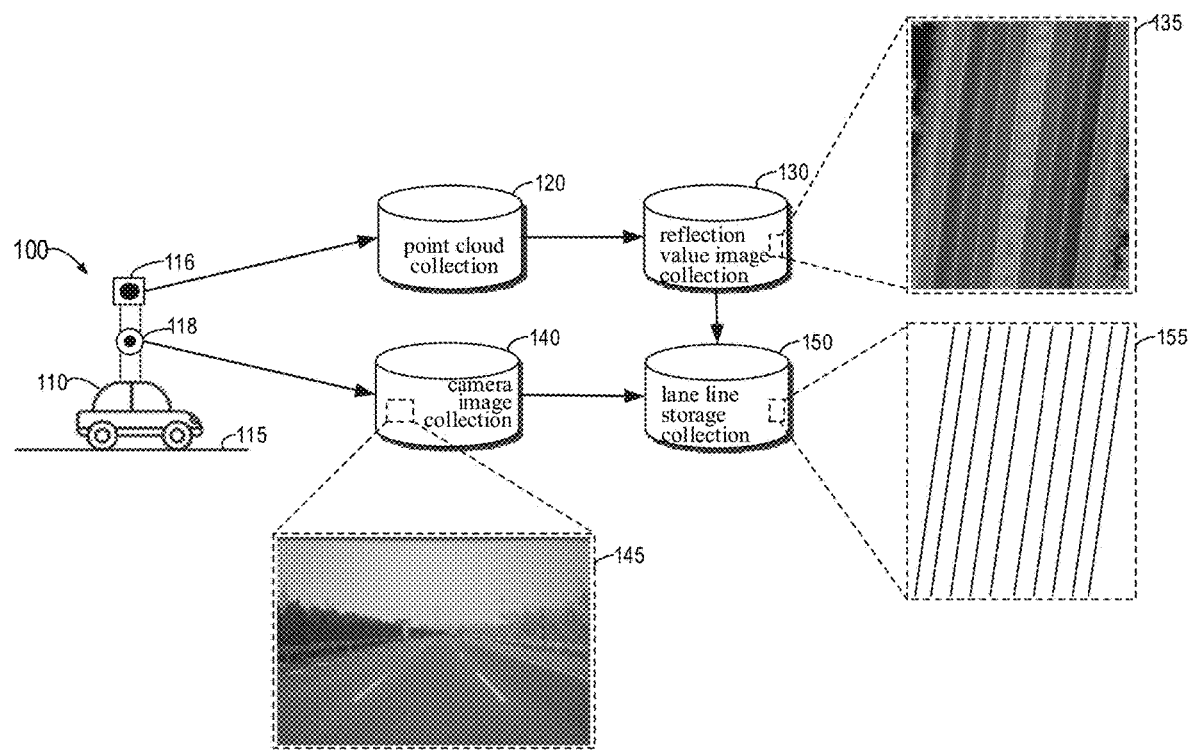
FIG. 1 is a schematic diagram illustrating an exemplary environment where embodiments of the present disclosure may be implemented.

Embodiments of the present disclosure will be described in more detail below with reference to the accompanying drawings. Although certain embodiments of the present disclosure are illustrated in the accompanying drawings, it should be understood that the present disclosure may be implemented in various manners without being limited by the embodiments elaborated herein. On the contrary, embodiments are provided to make the present disclosure more thorough and complete. It should be understood that, the accompanying drawings and embodiments of the present disclosure are merely used for exemplary purposes, and are not used to limit the protection scope of the present disclosure.

In the description of embodiments of the present disclosure, the term "includes" and its equivalents should be understood as an open "include" (a non-exclusive "include"), that is, "include but not limited to". The term "based on" should be understood as "based at least in part (at least partially based on)". The term "an embodiment" or "the embodiment" should be understood as "at least one embodiment". Other explicit and implicit definitions may also be included below.

Traditionally, a lane line may be extracted from a picture (such as an image) photographed by a camera, and then the lane line is transformed from two dimension to three dimension through a matrix transformation. However, there may be some following problems for extracting the lane line from the image captured by the camera: first, transforming the two-dimensional lane line to the three-dimensional lane line lacks space depth information, therefore a ground height needs to be assumed, which may cause an error; second, the transformation matrix used to transform from the two dimension to the three dimension requires a high accuracy, and if a calibration is not accurate, it may cause that a position of the obtained three-dimensional lane line is not accurate; third, due to a perspective effect, the farther away from the camera, the fewer pixels the line lane occupies in the image, and the less accurate the lane line has, causing that a direction of the lane line has certain angle deviation in space and merging lane lines from different picture frames is more difficult; fourth, extracting the lane line from the image is sensitive to weather (such as rain and snow weather), illumination (such as levels of light and shade), a road condition (such as congestion condition), and there may be a situation that the lane line cannot be extracted successfully.

An improvement for a traditional method is to extract the lane line by using a reflection value image generated from a point cloud collected by a laser radar. Each pixel in the reflection value image precisely corresponds to a coordinate (x, y, z) in the real world, such that the accuracy loss and a potential inaccuracy problem during the transformation from two dimension to three dimension may be reduced. Meanwhile, since a ground height may also be obtained from the reflection value image directly, there is no need to assume the ground height. However, the point cloud is obtained by a reflection of a laser. Under the condition that a reflection value of the lane line is very low, certain lane line(s) may be lost, leading to the lane lines being extracted not comprehensive enough.

Embodiments of the present disclosure provide a solution for extracting the lane line. In embodiments of the present disclosure, a lane line extracted by a laser point cloud and a lane line extracted from an image captured by the camera are merged to obtain a final lane line, such that the extracted final lane line is more accurate and comprehensive. Therefore, for the condition that the reflection value of the lane line in the reflection value image is low but the lane line is clear in the image captured by the camera, embodiments of the present disclosure may also ensure to comprehensively extract the lane line of the road. Detailed description will be made in the followings for some embodiments of the present disclosure with reference to FIGS. 1-8.

FIG. 1 is a schematic diagram illustrating an exemplary environment 100 where embodiments of the present disclosure may be implemented. The exemplary environment 100 may be used to automatically extract the lane line in a natural scene or other suitable scenes. As illustrated, the exemplary environment 100 includes a collection entity 110, a laser radar 116 of the collection entity 110, a camera 118 of the collection entity 110, a point cloud collection 120, a reflection value image collection 130, a camera image collection 140, and a lane-line storage collection 150. It should be understood that, a plurality of storage libraries illustrated in FIG. 1 are merely logical divisions, which may also be deployed on the same physical device.

The collection entity 110 may be a driving system, such as an automatic driving system or a non-automatic driving system. The driving system may be a common personal vehicle, and may also be a specialized collection vehicle or any other suitable vehicle. In the following, the vehicle is taken as an example to discuss embodiments of the present disclosure. However, it should be understood that, the solution of the present disclosure may also be similarly applied to other types of collection entities. It should be noted that, the term "collection entity" herein refers to a carrier collecting point cloud by means of a laser radar and collecting an image by means of a camera, and the collection entity itself may or may not include the laser radar and/or the camera.

In embodiments of the present disclosure, "laser radar or camera of the collection entity" may be a laser radar or a camera fixed on the collection entity, such as, provided on the collection entity or in the collection entity in a fixed form. Alternatively, "laser radar or camera of the collection entity" may also be a laser radar or a camera carried in an unfixed form by the collection entity, such as a laser radar or a camera carried by a passenger of a vehicle, a laser radar or a camera wore on a moving individual and so on.

It should be understood that, the term "laser radar" herein refers to a radar device detecting a feature amount such as a position and/or a speed by emitting a laser beam, the principle of which is to send a detecting signal (the laser beam) to a target, and then the signal received which is reflected from the target is compared with the emitted signal, and then after performing a proper processing, information related to the target, for example, at least one parameter such as a target distance, a direction, a height, a speed, a posture, and even a shape, may be obtained. In addition, the term "camera" herein should be understood as a generalized camera, which is not only a camera photographing visible lights, but also other types of imaging devices.

As illustrated in FIG. 1, the collection entity 110 is moving on the road 115. The collection entity 110 includes, for example, a laser radar 116 and a camera 118 fixed thereon. The laser radar 116 may collect the point cloud data of the road 115 and its surrounding environment while the collection entity 110 is moving. The point cloud refers to massive point set of features on the target surface (such as the road and the surrounding environment). The camera 118 may collect images of the road 115 while the collection entity 110 is moving. It should be understood that, the point cloud data and the camera image of the road 115 may be collected following a predetermined route and/or in a collection cycle. Of course, it is also up to the driver to determine the collection route and/or the collection cycle.

In some embodiments, while the camera 118 collects images, the Global Positioning System (GPS) and the inertial measuring unit (IMU) may also be used to measure a three-dimensional coordinate of an object in the environment. In addition, the positioning system is not limited to the GPS. The Galileo Satellite Positioning System in Europe, the BeiDou Satellite Positioning System in China and the like may also be used in combination with embodiments of the present disclosure.

Referring to FIG. 1, the laser radar 116 may collect the point cloud data related to the road 115, and store the point cloud data in the point cloud collection 120. The reflection value image of the road may be generated based on the point cloud collection 120, and the reflection value image is stored in the reflection value image collection 130. For example, when a laser beam is illuminated on the target surface, the reflected laser may carry information such as the direction, the distance, the reflection value. When the laser beam is scanned following a certain track, the reflected laser point information may be recorded at the same time of the scanning. Since the scanning is extremely fine, massive laser points may be obtained, thereby forming the point cloud.

In some embodiments, the reflection value image is a two-dimensional image. However, the reflection value image may include a reflection value of each pixel (such as rgb values) and height information (a z value) of the ground where the pixel locates. Therefore, each pixel in the reflection value image has four attribute values (such as rgbz values) according to embodiments of the present disclosure. The reflection value image collection 130 illustrated in FIG. 1 stores an exemplary reflection value image 135, which is an aerial view of the lane line of a road, and the lane line of the road may be extracted based on a processing for the reflection value image 135. In addition, since the reflection value image 135 also includes the height information of the ground where each pixel locates, the extracted lane line may be directly transformed from a two-dimensional lane line to a three-dimensional lane line.

The camera 118 may collect the image (such as a picture) of the road, and store the collected images in the camera image collection 140. The camera image collection 10 illustrated in FIG. 1 stores an exemplary camera image 145, which is photographed while the collection entity 110 is moving. The camera image 145 includes the lane line of the road, and the lane line of the road may also extracted based on a processing for the camera image 145. Afterwards, the extracted two-dimensional lane line may be transformed to the three-dimensional lane line based on a calibration for the camera. Of course, there may be some transform errors.

Next, after extracting a group of lane lines through the reflection value image in the reflection value image collection 130, and extracting another group of lane lines through the camera image in the camera image collection 140, the two groups of lane lines may be merged (such as, one-way filled or mutually filled), to determine a final lane line of the road, and the generated lane line may be stored in the lane line storage collection 150. FIG. 1 illustrates an example of the lane line 155 stored in the lane line storage collection 150.

It should be understood that, the final lane line may be determined non-instantly. For example, the image may be obtained from the reflection value image collection 130 and the camera image collection 140 by a local or remote electronic device, the two groups of lane lines are generated by processing the obtained image, and the final lane line is determined by merging the two groups of lane lines. Alternatively, the final lane line may also be determined in real time. For example, the electronic device in the collection entity 110 or the remote electronic device processes the obtained point cloud data and the camera image in real time, to determine the final lane line in real time. Detailed description of some exemplary embodiments for determining the final lane line of the road is made in the following with reference to FIGS. 2-7.

Figure 2:
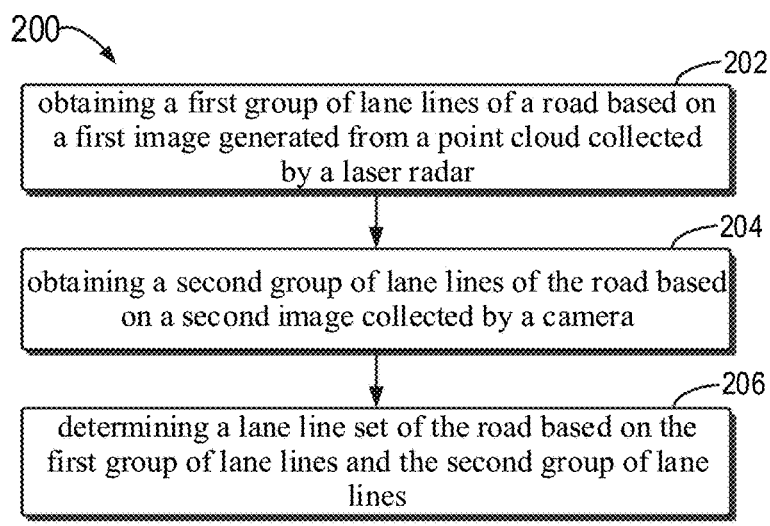
FIG. 2 is a flow chart illustrating a method for extracting a lane line according to an embodiment of the present disclosure.

FIG. 2 is a flow chart illustrating a method 200 for extracting a lane line according to an embodiment of the present disclosure. For a convenient and clear description, embodiments of the present disclosure will be described in the following with reference to the environment 110 illustrated in FIG. 1. However, it should be understood that, the environment 100 illustrated in FIG. 1 is merely an exemplary environment of embodiments of the present disclosure, and is not used to limit the scope of embodiments of the present disclosure.

At block S202, a first group of lane lines of a road is obtained based on a first image generated from a point cloud collected by the laser radar. For example, lane lines (the lane lines generated based on the point cloud collected by the laser radar is referred to the "first group of lane lines") of a certain road is obtained based on the reflection value image (the image generated based on the point cloud collected by the laser radar is referred to the "first image") in the reflection value image collection 130 in FIG. 1. It should be understood that, the first group of lane lines may be extracted in real time during the collecting procedure of the collection entity, and may not be extracted from the reflection value image collection 130. In some embodiments, the lane line may be extracted from the image 135 by recognizing the image 135. In some embodiments, a lane line extracting model is trained by using the machine learning, and the lane line in the reflection value image is extracted by using the trained lane line extracting model. The related exemplary implementation will be described below with reference to the embodiment of FIG. 3.

In some embodiments, a plurality of images may be generated from the point cloud collected by the laser radar to obtain a plurality of lane lines. A global first group of lane lines may be generated based on an optimization for the plurality of lane lines. For example, a plurality of reflection value images may be organized according to the world coordinate system of the physical world, and disconnected lane lines are connected by using a relationship between lane lines in neighboring reflection value images.

At block 204, a second group of lane lines of the road are obtained based on a second image collected by the camera. For example, a lane line (the lane line generated based on the camera image is referred to the "second group of lane lines") of a certain road is obtained based on the camera image (for example, the image collected by the camera is referred to the "second image") in the camera image collection 140 illustrated in FIG. 1. It should be understood that, the second group of lane lines may be extracted in real time during the collecting procedure of the collection entity, and may not needed to be obtained from the camera image collection. In some embodiments, the lane line may be extracted from the camera image 145 by performing an image recognition on the camera image 145. Any image recognition method which is well known or will be developed in the future may be used in combination with the present disclosure to extract the lane line from the camera image.

At block 206, a lane line set of the road is determined based on the first group of lane lines and the second group of lane lines. For example, the final lane line is determined by merging the first group of lane line extracted from the reflection value image and the second group of lane lines extracted from the camera image. The exemplary implementation for determining the final lane line based on the two groups of lane lines is described below with reference to FIGS. 4-6. Therefore, the method 200 according to embodiments of the present disclosure may enable the final lane line extracted more accurate and comprehensive.

Figure 3:
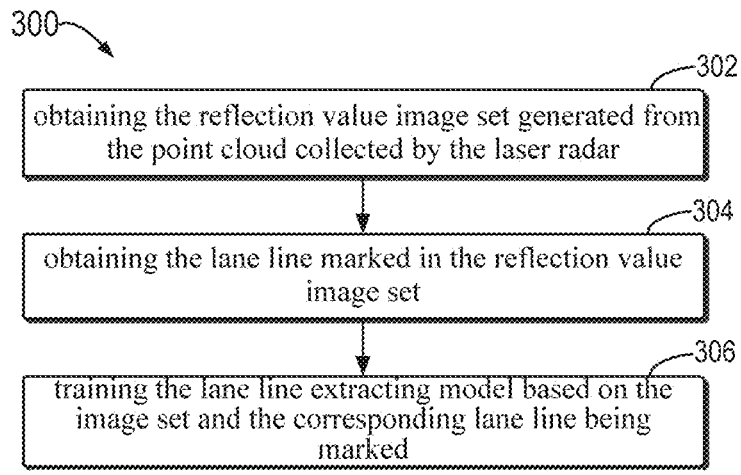
FIG. 3 is a flow chart illustrating a method for training a lane line extracting model according to an embodiment of the present disclosure.

FIG. 3 is a flow chart illustrating a method 300 for training a lane line extracting model according to embodiments of the present disclosure. It should be understood that, the trained lane line extracting model based on the method 300 may be used to implement the operation for extracting the first group of lane lines at block 202 in the method 200 described in FIG. 2.

At block 302, the reflection value image set generated from the point cloud collected by the laser radar is obtained. For example, the reflection value image set is obtained from the reflection value image collection 130 described in FIG. 1. At block 304, the lane line marked in the reflection value image set is obtained. For example, for the obtained reflection value image set, the lane line sample in the reflection value image set may be marked (e.g., marked manually or marked automatically by other method). At block 306, the lane line extracting model is trained based on the image set and the corresponding lane line being marked. Alternatively, the training may be performed by using a full convolutional neural network, such that a lane line extracting model with a high precision is obtained. Alternatively, the lane line extracting model may be trained by using other neural network models or non-neural network models. Afterwards, the first group of lane lines may be obtained based on the reflection value image by using the trained lane line extracting model.

According to the method 300 of embodiments of the present disclosure, the lane line extracting model generated performing a training using machine learning may not need to manually provide the feature set, and the lane line extraction may be more accurate by using massive training data. Therefore, the method 300 of embodiments of the present disclosure may not only improve the accuracy of the lane line extraction, but also improve the efficiency of the lane line extraction.

Figure 4:
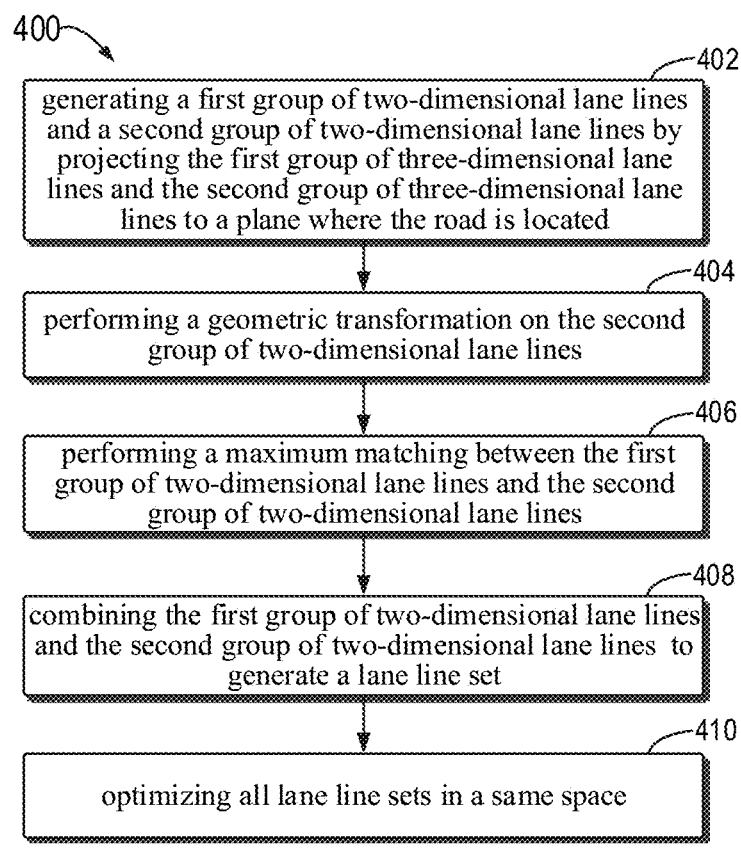
FIG. 4 is a flow chart illustrating a method for matching two groups of lane lines according to an embodiment of the present disclosure.

FIG. 4 is a flow chart illustrating a method 400 for matching two groups of lane lines according to an embodiment of the present disclosure. It should be understood that, the method 400 may be an exemplary implementation of the act at block 206 in the method 200 described with reference to FIG. 2 above.

Before the method 400 starts, the first group of lane lines and the second group of lane lines may be transformed to three-dimensional lane lines. In some embodiments, based on height information (z value) of each pixel in the first image, the first group of lane lines may be transformed to a first group of three-dimensional lane lines by using a transformation relationship between the reflection value image and the world coordinate system. In some embodiments, the second group of lane lines may be transformed to a second group of three-dimensional lane lines based on the calibration for the camera or the height information of each pixel in the first image at the corresponding position (e.g., the height where the road locates may be determined in the first image). Any camera calibration method which is well known or will be developed in the future may be used in combination with the present disclosure to transform the second group of lane lines to the second group of three-dimensional lane lines.

At block 402, a first group of two-dimensional lane lines and a second group of two-dimensional lane lines are generated by projecting the first group of three-dimensional lane lines and the second group of three-dimensional lane lines to a plane where the road is located. At block 404, a geometric transformation is performed on the second group of two-dimensional lane lines, in which, the geometric transformation includes at least one of a rotation and a translation. As the second group of three-dimensional lane lines is transformed from the second group of two-dimensional lane lines, a potential matrix transformation error and an error of the lane line itself will cause that the first group of lane lines may not completely match to the second group of lane lines. Therefore, the geometric transformation is performed on the second group of two-dimensional lane lines, and at block 406, a maximum matching between the first group of two-dimensional lane lines and the second group of two-dimensional lane lines subjected to the geometric transformation may be performed. In some embodiments, when a coincidence rate of two groups of lane lines for the same road is the highest, it may be considered that the two groups of lane lines achieve the maximum matching.

At block 408, one or more lane lines present in the second group of two-dimensional lane lines subjected to the geometric transformation and absent from the first group of two-dimensional lane lines are determined; and the lane line set is determined by combining the first group of two-dimensional lane lines with the one or more lane lines. In other words, the first group of lane lines may be determined as a reference, and the second group of lane lines is rotated and/or translated within a certain range. When the rotated or translated second group of lane lines are furthest matched with the first group of lane lines, the lane line group may be taken as a candidate lane line set. In some embodiments, a union set of the two groups of lane lines may be directly determined as the final lane line set.

At block 410, a plurality of groups of candidate lane line sets are determined, and optimized in the same three-dimensional space, to obtain the final lane line set. In some embodiments, a plurality of lane line sets of a plurality of roads may be determined by using the methods of embodiments of the present disclosure, and the plurality of lane line sets may be transformed to a plurality of three-dimensional lane line sets. Then, confidences of lane lines in the plurality of three-dimensional lane line sets may be determined, and the plurality of three-dimensional lane line sets are optimized based on the confidence. For example, the lane lines that are spatial approached (of which end points are close) or should be connected on a straight line may be processed, and the lane line whose length is less than a certain threshold is removed, such that the final lane line may be obtained. Therefore, with the method 400 of the embodiment of the present disclosure, an adjustment may be performed by using the geometric transformation, and the two groups of lane lines may achieve the maximum matching by using the maximum matching method, thereby obtaining a more comprehensive lane line set.

Figure 5:
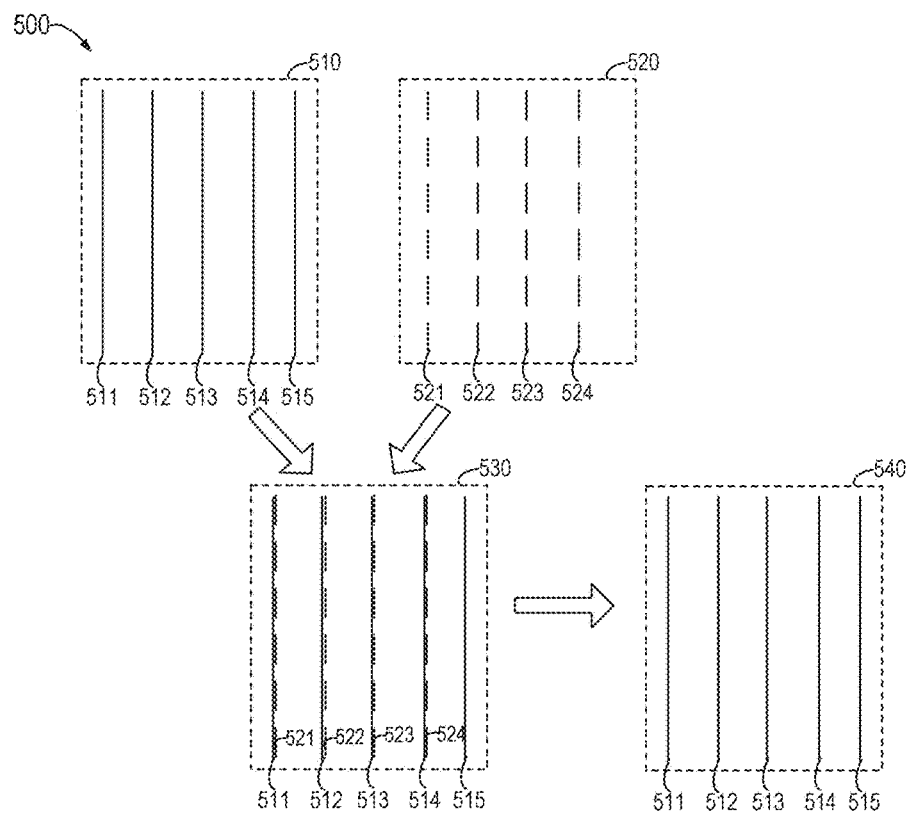
FIG. 5 is a schematic diagram of matching two groups of lane lines according to an embodiment of the present disclosure.

FIG. 5 is a schematic diagram 500 of matching two groups of lane lines according to an embodiment of the present disclosure. As illustrated in FIG. 5, for an imported road, a first group of lane lines 510 extracted from the reflection value image generated by the point cloud collected by the laser radar includes lanes lines 511, 512, 513, 514 and 515, and a second group of lane lines 520 extracted from the camera image includes lane lines 521, 522, 523 and 524. Next, a matching is performed on the two groups of lane lines to obtain a candidate lane line set 530, in which, the two groups of lane lines may be almost perfectly matched. Therefore, the first group of lane lines 510 may be determined as the final lane line set 540, including the lane lines 511, 512, 513, 514 and 515.

Figure 6:
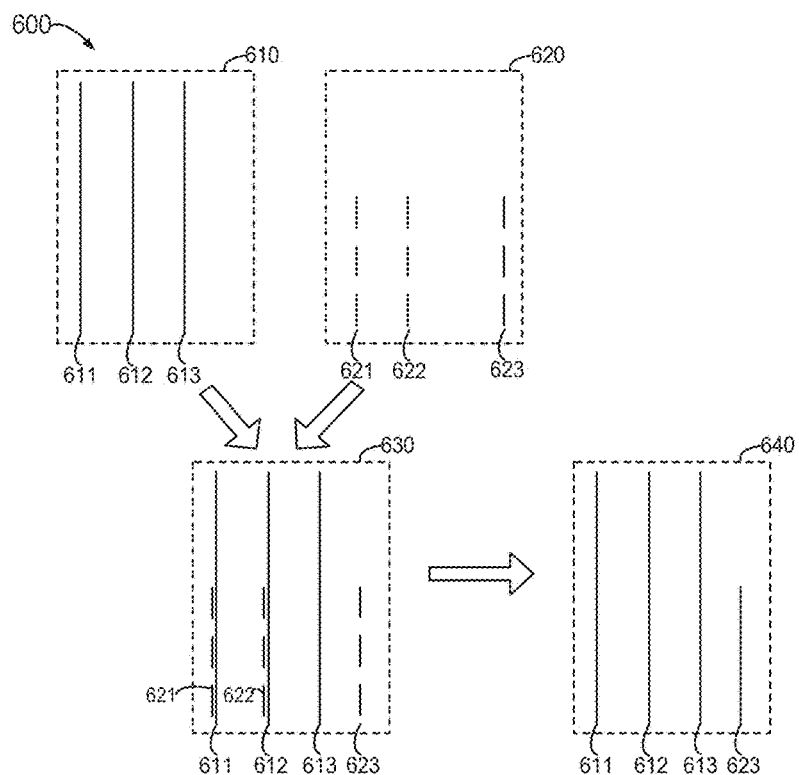
FIG. 6 is a schematic diagram of matching two groups of lane lines according to another embodiment of the present disclosure.

FIG. 6 is a schematic diagram 600 of matching two groups of lane lines according to another embodiment of the present disclosure. As illustrated in FIG. 6, a first group of lane lines 610 extracted from the reflection value image generated from the point cloud collected by the laser radar includes lanes lines 611, 612 and 613, and a second group of lane lines 620 extracted from the camera image includes lane lines 621, 622 and 623. Since the two groups of lane lines do not coincide completely, the first group of lane lines may be fixed, and then the second group of lane lines is translated to the right. Next, the maximum matching is performed on the two groups of lane lines to obtain a candidate lane line set 630, in which the two groups of lane lines can not completely match, the lane line 613 is absent from the second group of lane lines 620, and the lane line 623 is absent from the first group of lane lines. In some embodiments, the first group of lane lines 610 may be determined as a reference, and the lane line 623 is added to the first group of lane lines 610 to generate the final lane line set 640, including the lane lines 611, 612 and 613 from the first group of lane lines 610 and the lane line 623 from the second group of lane lines 620. Therefore, in a case that the reflection value of the lane line in the reflection value image is relatively weak while the lane line may be visible in the camera image, embodiments of the present disclosure may ensure to fully extract the lane lines of the road.

Figure 7:
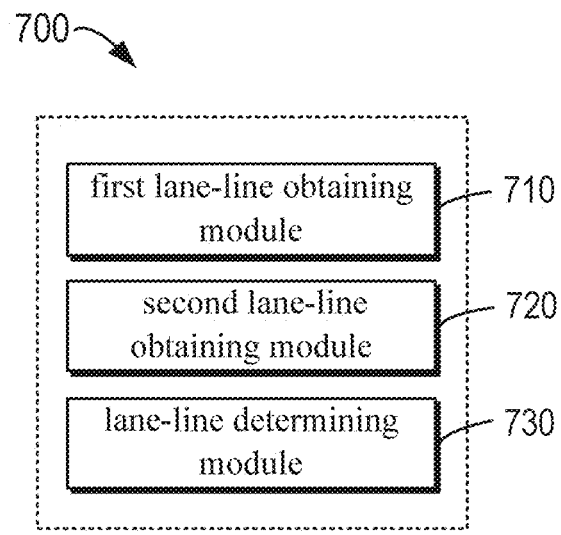
FIG. 7 is a block diagram illustrating an apparatus for extracting a lane line according to an embodiment of the present disclosure.

FIG. 7 is a block diagram illustrating an apparatus 700 for extracting a lane line according to an embodiment of the present disclosure. As illustrated in FIG. 7, the apparatus 700 includes a first lane-line obtaining module 710, a second lane-line obtaining module 720 and a lane-line determining module 730. The first lane-line obtaining module 710 is configured to obtain a first group of lane lines of a road based on a first image generated from a point cloud collected by a laser radar. The second lane-line obtaining module 720 is configured to obtain a second group of lane lines of the road based on a second image collected by a camera. The lane-line determining module 730 is configured to determine a lane line set of the road based on the first group of lane lines and the second group of lane lines.

In some embodiments, the first lane-line obtaining module 710 includes a first lane-line extracting module. The first lane-line extracting module is configured to extract the first group of lane lines by using a lane line extracting model based on the first image, in which, the lane line extracting model is generated by performing a training on an image set and a lane line marked in the image set.

In some embodiments, the first lane-line obtaining module 710 includes a multiple lane-line obtaining module and a first optimization module. The multiple lane-line obtaining module is configured to obtain a plurality of lane lines based on a plurality of images generated from the point cloud collected by the laser radar, in which, the plurality of images includes the first image; and the first optimization module is configured to determine the first group of lane lines based on an optimization for the plurality of lane lines.

In some embodiments, the first lane line obtaining module 710 includes a first transformation module. The first transformation module is configured to transform the first group of lane lines to a first group of three-dimensional lane lines based on height information of each pixel in the first image.

In some embodiments, the second lane-line obtaining module 720 includes a second transformation module, configured to transform the second group of lane lines to a second group of three-dimensional lane lines based on a calibration for the camera or the height information of each pixel in the first image.

In some embodiments, the lane-line determining module 730 includes a lane-line projecting module and a first matching module. The lane-line projecting module is configured to generate a first group of two-dimensional lane lines and a second group of two-dimensional lane lines by projecting the first group of three-dimensional lane lines and the second group of three-dimensional lane lines to a plane where the road is located. The first matching module is configured to determine the lane line set by matching a lane line in the first group of two-dimensional lane lines with a lane line in the second group of two-dimensional lane lines.

In some embodiments, the first matching module includes a geometric transformation module and a second matching module. The geometric transformation module is configured to perform a geometric transformation on the second group of two-dimensional lane lines, in which, the geometric transformation includes at least one of a rotation and a translation. The second matching module is configured to determine the lane line set by matching the lane line in the first group of two-dimensional lane lines with a lane line in the second group of two-dimensional lane lines subjected to the geometric transformation.

In some embodiments, the second matching module includes a determining module and a combination module. The determining module is configured to determine one or more lane lines present in the second group of two-dimensional lane lines subjected to the geometric transformation and absent from the first group of two-dimensional lane lines. The combination module is configured to determine the lane line set by combining the first group of two-dimensional lane lines with the one or more lane lines.

In some embodiments, the apparatus 700 also includes a second lane-line determining module, a three-dimensional transformation module, a confidence determining module and a second optimization module. The second lane-line determining module is configured to determine at least one lane line set of at least one road related to the road. The three-dimensional transformation module is configured to transform the lane line set and the at least one lane line set to a plurality of three-dimensional lane line sets. The confidence determining module is configured to determine a confidence of a lane line in the plurality of three-dimensional lane line sets. The second optimization module is configured to optimize the plurality of three-dimensional lane line sets based on the confidence.

It should be understood that, the first lane-line obtaining module 710, the second lane-line obtaining module 720 and the lane-line determining module 730 illustrated in FIG. 7 may be included in one or more electronic devices, and may also be included in the collection entity. Moreover, it should be understood that, the modules illustrated in FIG. 7 may execute steps or acts of the methods or the procedures of embodiments of the present disclosure.

Figure 8:
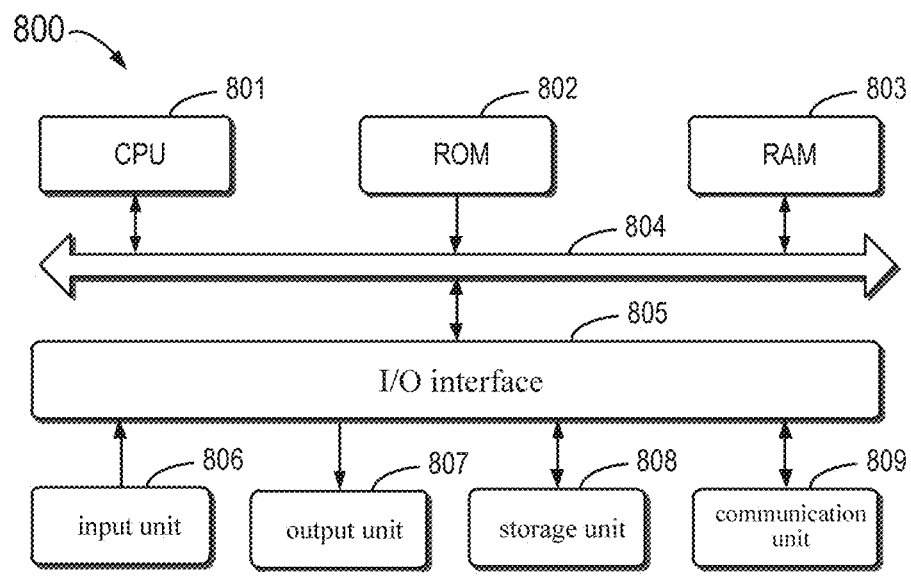
FIG. 8 is a block diagram illustrating an electronic device capable of implementing a plurality of embodiments of the present disclosure.

FIG. 8 is a block diagram illustrating an exemplary device 800 for implementing embodiments of the present disclosure. It should be understood that, the device 800 may be configured to implement the apparatus 700 for extracting the lane line described in the present disclosure. As illustrated in FIG. 8, the device 800 includes a Central Processing Unit (CPU) 801, which may execute various appropriate acts and processing based on computer program instructions stored in a read-only memory (ROM) 802 or computer program instructions loaded from a storage unit 808 to a random-access memory (RAM) 803. In the RAM 803, various programs and data needed for the operation of the device 800 may be stored. The CPU 801, the ROM 802, and the RAM 803 are connected to each other through a bus 804. An input/output (I/O) interface 805 is also connected to the bus 804.

A plurality of components in the device 800 are connected to the I/O interface 805, including: an input unit 806, such as a keyboard, a mouse, etc.; an output unit 807, such as various types of displays, speakers, etc.; the storage unit 808, such as a disk, a CD, etc.; and a communication unit 809, such as a network card, a modem, a wireless communication transceiver, etc. The communication unit 809 allows the device 800 to exchange information/data with other devices via computer networks such as the Internet and/or various telecommunications networks.

The processing unit 801 executes the various methods and procedures described above, such as the methods 200, 300, and 400. For example, in some embodiments, the methods 200, 300, and 400 may be implemented as computer software programs, which are physically contained in a machine-readable medium, such as the storage unit 808. In some embodiments, some or all of the computer programs may be loaded and/or installed on the device 800 via the ROM 802 and/or the communication unit 809. The computer programs may execute one or more acts or steps of the methods 200, 300 and 400 described above when loaded to the RAM 803 and executed by the CPU 801. Alternatively, in other embodiments, the CPU 801 may be configured to execute the method 200 and/or the method 300 by any other appropriate ways (such as, by means of a firmware).

It should be understood that, the collection entity 110 (such as a vehicle or a robot) according to embodiments of the present disclosure may include the device 800 illustrated in FIG. 8.

The above functions described herein may be executed at least partially by one or more hardware logic components. For example, without limitation, exemplary types of hardware logic components, including a field-programmable gate array (FPGA), an application-specific integrated circuit (ASIC), an application specific standard product (ASSP), a system on chip (SOC), a load programmable logic device (CPLD) and so on, may be used.

The program codes for implementing the method of embodiments of the present disclosure may be written in any combination of one or more program languages. These program codes may be provided for a processor or a controller of a general-purpose computer, a special-purpose computer, or other programmable data-processing devices, such that the functions/operations regulated in the flow charts and/or block charts are implemented when the program codes are executed by the processor or the controller. The program codes may be completely executed on the machine, partly executed on the machine, partly executed on the machine as a standalone package and partly executed on a remote machine or completely executed on a remote machine or a server.

In the context of the present disclosure, the machine readable medium may be a tangible medium, which may include or store the programs for use of an instruction execution system, apparatus or device or for use in conjunction with the instruction execution system, apparatus or device. The machine readable medium may be a machine readable signal medium or a machine readable storage medium. The machine readable medium may include but not limited to electronic, magnetic, optical, electromagnetic, infrared, or semiconductor systems, apparatuses or devices, or any appropriate combination of the foregoing contents. A more detailed example of the machine readable storage medium includes electrical connections based on one or more lines, a portable computer disk, a hard disk, a random access memory (RAM), a read-only memory (ROM), an erasable programmable read only memory (an EPROM or a flash memory), an optical fiber, a compact disc read-only memory (CD-ROM), an optical storage device, a magnetic storage device, or any appropriate combination of the above contents.

In addition, although respective act or step is described in a particular sequence, it should be understood that such act or step are required to be executed in the specified or sequential order as illustrated, or all illustrated acts or steps are required to be executed to achieve a desired result. Under certain environment, multitasking and parallel processing may be beneficial. In the same way, although several specific implementation details are included in the above discussion, these should not be interpreted as limitations of the scope of the present disclosure. Certain features described in the context of a single embodiment may also be in a combination manner to be implemented in a single implementation. On the contrary, the various features described in the context of a single implementation may also be implemented in multiple implementations individually or in any appropriate sub-combination.

Although language specific to structural features and/or method logic actions has been employed to describe the embodiments of the present disclosure, it should be understood that the subject matter defined in the appended claims is not necessarily limited to the specific features or acts described above. On the contrary, the specific features or acts described above are merely an exemplary form for implementing the claims.

What is claimed is:

1. A method for extracting a lane line, comprising:
   obtaining a first group of lane lines of a road based on a first image generated from a point cloud collected by a laser radar, comprising:
      obtaining a plurality of lane lines based on a plurality of images generated from the point cloud collected by the laser radar, in which, the plurality of images comprises the first image; and
      determining the first group of lane lines based on an optimization for the plurality of lane lines by: organizing a plurality of reflection value images according to a world coordinate system of a physical world, connecting disconnected lane lines by using a relationship between lane lines in neighboring images in the plurality of images;
   obtaining a second group of lane lines of the road based on a second image collected by a camera; and
   determining a lane line set of the road based on the first group of lane lines and the second group of lane lines by:
      generating a first group of two-dimensional lane lines and a second group of two-dimensional lane lines by projecting a first group of three-dimensional lane lines and a second group of three-dimensional lane lines to a plane where the road is located;
      performing a geometric transformation on the second group of two-dimensional lane lines, in which, the geometric transformation comprises at least one of a rotation and a translation;
      determining one or more lane lines present in the second group of two-dimensional lane lines subjected to the geometric transformation and absent from the first group of two-dimensional lane lines; and
      determining the lane line set by combining the first group of two-dimensional lane lines with the one or more lane lines.

2. The method according to claim 1, wherein, obtaining the first group of lane lines comprises:
   extracting the first group of lane lines by using a lane line extracting model based on the first image, in which, the lane line extracting model is generated by performing a training on an image set and a lane line marked in the image set.

3. The method according to claim 1, wherein, obtaining the first group of lane lines comprises:

transforming the first group of lane lines to a first group of three-dimensional lane lines based on height information of each pixel in the first image.

4. The method according to claim 1, wherein, obtaining the second group of lane lines comprises:
transforming the second group of lane lines to a second group of three-dimensional lane lines based on a calibration for the camera or height information of each pixel in the first image.

5. The method according to claim 1, further comprising:
determining at least one lane line set of at least one road related to the road;
transforming the lane line set and the at least one lane line set to a plurality of three-dimensional lane line sets;
determining a confidence of a lane line in the plurality of three-dimensional lane line sets; and
optimizing the plurality of three-dimensional lane line sets based on the confidence.

6. An apparatus for extracting a lane line, comprising:
one or more processors; and
a memory, configured to store one or more computer programs; wherein when the one or more computer programs are executed, the one or more processors are caused to:
obtain a first group of lane lines of a road based on a first image generated from a point cloud collected by a laser radar by performing: obtaining a plurality of lane lines based on a plurality of images generated from the point cloud collected by the laser radar, in which, the plurality of images comprises the first image; determining the first group of lane lines based on an optimization for the plurality of lane lines by: organizing a plurality of reflection value images according to a world coordinate system of a physical world, connecting disconnected lane lines by using a relationship between lane lines in neighboring images in the plurality of images;
obtain a second group of lane lines of the road based on a second image collected by a camera; and
determine a lane line set of the road based on the first group of lane lines and the second group of lane lines by causing the one or more processors to:
generate a first group of two-dimensional lane lines and a second group of two-dimensional lane lines by projecting a first group of three-dimensional lane lines and a second group of three-dimensional lane lines to a plane where the road is located;
perform a geometric transformation on the second group of two-dimensional lane lines, in which, the geometric transformation comprises at least one of a rotation and a translation;
determine one or more lane lines present in the second group of two-dimensional lane lines subjected to the geometric transformation and absent from the first group of two-dimensional lane lines; and
determine the lane line set by combining the first group of two-dimensional lane lines with the one or more lane lines.

7. The apparatus according to claim 6, wherein, the one or more processors obtain the first group of lane lines by performing an act of:
extracting the first group of lane lines by using a lane line extracting model based on the first image, in which, the lane line extracting model is generated by performing a training on an image set and a lane line marked in the image set.

8. The apparatus according to claim 6, wherein, the one or more processors obtain the first group of lane lines by performing an act of:
transforming the first group of lane lines to a first group of three-dimensional lane lines based on height information of each pixel in the first image.

9. The apparatus according to claim 6, wherein, the one or more processors obtain the second group of lane lines by performing an act of:
transforming the second group of lane lines to a second group of three-dimensional lane lines based on a calibration for the camera or height information of each pixel in the first image.

10. The apparatus according to claim 6, wherein the one or more processors are configured to:
determine at least one lane line set of at least one road related to the road;
transform the lane line set and the at least one lane line set to a plurality of three-dimensional lane line sets;
determine a confidence of a lane line in the plurality of three-dimensional lane line sets; and
optimize the plurality of three-dimensional lane line sets based on the confidence.

11. A non-transitory computer-readable storage medium having a computer program stored thereon, wherein when the computer program is executed by a processor, the processor is caused to perform acts of:
obtaining a first group of lane lines of a road based on a first image generated from a point cloud collected by a laser radar, comprising: obtaining a plurality of lane lines based on a plurality of images generated from the point cloud collected by the laser radar, in which, the plurality of images comprises the first image; determining the first group of lane lines based on an optimization for the plurality of lane lines by: organizing a plurality of reflection value images according to a world coordinate system of a physical world, connecting disconnected lane lines by using a relationship between lane lines in neighboring images in the plurality of images;
obtaining a second group of lane lines of the road based on a second image collected by a camera; and
determining a lane line set of the road based on the first group of lane lines and the second group of lane lines by:
generating a first group of two-dimensional lane lines and a second group of two-dimensional lane lines by projecting a first group of three-dimensional lane lines and a second group of three-dimensional lane lines to a plane where the road is located;
performing a geometric transformation on the second group of two-dimensional lane lines, in which, the geometric transformation comprises at least one of a rotation and a translation;
determining one or more lane lines present in the second group of two-dimensional lane lines subjected to the geometric transformation and absent from the first group of two-dimensional lane lines; and
determining the lane line set by combining the first group of two-dimensional lane lines with the one or more lane lines.

* * * * *